(12) United States Patent
Son et al.

(10) Patent No.: US 11,670,002 B2
(45) Date of Patent: Jun. 6, 2023

(54) APPARATUS AND METHOD FOR IMAGE-BASED POSITIONING TO PREDICT A CAMERA POSE FROM IMAGE DATA

(71) Applicant: ELECTRONICS AND TELECOMMUNICATIONS RESEARCH INSTITUTE, Daejeon (KR)

(72) Inventors: Jinhee Son, Daejeon (KR); Vladimirov Blagovest Iordanov, Changwon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 77 days.

(21) Appl. No.: 17/117,402

(22) Filed: Dec. 10, 2020

(65) Prior Publication Data

US 2021/0183094 A1 Jun. 17, 2021

(30) Foreign Application Priority Data

Dec. 11, 2019 (KR) .................. 10-2019-0164419
Dec. 8, 2020 (KR) .................. 10-2020-0170716

(51) Int. Cl.
*G06T 7/77* (2017.01)
*G06V 10/764* (2022.01)
(Continued)

(52) U.S. Cl.
CPC .......... *G06T 7/77* (2017.01); *G06F 18/24147* (2023.01); *G06F 18/254* (2023.01);
(Continued)

(58) Field of Classification Search
None
See application file for complete search history.

(56) References Cited

U.S. PATENT DOCUMENTS 9,251,590 B2 * 2/2016 Sharp ..................... G06T 7/74
10,546,387 B2 1/2020 Hirzer et al.
(Continued)

FOREIGN PATENT DOCUMENTS

KR 10-2020-0023221 A 3/2020

OTHER PUBLICATIONS

Alex Kendall et al., "PoseNet: A Convolutional Network for Real-Time 6-DOF Camera Relocalization", 2015 IEEE International Conference on Computer Vision.
(Continued)

*Primary Examiner* — Tahmina N Ansari
(74) *Attorney, Agent, or Firm* — LRK Patent Law Firm

(57) ABSTRACT

An apparatus and a method image classification based positioning are provided. For image-based positioning to predict a camera pose from image data, a positioning apparatus obtains a prediction result indicating which cell the image data belongs to among cells constituting a space for positioning from a classification network that processes the image data based on a pre-learned weight. The positioning apparatus obtains map information on the space for positioning by using a cell index selected based on the prediction result, and the map information includes minimum and maximum values of coordinates constituting a cell for each cell index, and a cell size. A position of the image data based on the map information is calculated to output a corresponding camera pose.

19 Claims, 16 Drawing Sheets

(51) Int. Cl.
   *G06T 7/70* (2017.01)
   *G06F 18/25* (2023.01)
   *G06F 18/2413* (2023.01)
   *G06V 10/82* (2022.01)
   *G06V 20/10* (2022.01)

(52) U.S. Cl.
   CPC ............. *G06T 7/70* (2017.01); *G06V 10/764* (2022.01); *G06V 10/82* (2022.01); *G06V 20/10* (2022.01); *G06T 2207/20081* (2013.01); *G06T 2207/30244* (2013.01)

(56) References Cited

U.S. PATENT DOCUMENTS

| | | | |
|---|---|---|---|
| 10,572,072 B2* | 2/2020 | Wang | H04N 13/271 |
| 2013/0107010 A1* | 5/2013 | Hoiem | G06K 9/00 |
| | | | 348/46 |
| 2018/0129935 A1 | 5/2018 | Kim et al. | |
| 2019/0108651 A1 | 4/2019 | Gu et al. | |
| 2019/0164301 A1 | 5/2019 | Kim | |
| 2020/0065976 A1* | 2/2020 | Han | G06K 9/6273 |

OTHER PUBLICATIONS

Samarth Brahmbhatt et al., "Geometry-Aware Learning of Maps for Camera Localization", arXiv:1712.03342v3 [cs.CV] Apr. 2, 2018.
Soham Saha et al., "Improved Visual Relocalization by Discovering Anchor Points", arXiv:1811.04370v1 [cs.CV] Nov. 11, 2018.

* cited by examiner

APPARATUS AND METHOD FOR IMAGE-BASED POSITIONING TO PREDICT A CAMERA POSE FROM IMAGE DATA

CROSS-REFERENCE TO RELATED APPLICATIONS

This application claims priority to and the benefit of Korean Patent Application Nos. 10-2019-0164419 filed in the Korean Intellectual Property Office on Dec. 11, 2019 and 10-2020-0170716 filed in the Korean Intellectual Property Office on Dec. 8, 2020, the entire contents of which are incorporated herein by reference.

BACKGROUND OF THE INVENTION

1. Field of the Invention

The present disclosure relates to image-based positioning, and more particularly, to an apparatus and a method for image classification based positioning.

2. Description of Related Art

Most recent image-based positioning techniques using a neural network are based on PoseNet, and PoseNet uses a method of estimating a plurality of parameters representing the position and direction of a camera pose through regression by receiving an image.

In addition, in the recently proposed MapNet, a loss function is defined and learned not only about the absolute position and direction of a camera, but also the relative position and direction between two frames, thereby improving positioning performance.

In addition, another image-based positioning technique is a method of finding location information by considering classification and regression. This method finds X coordinates and Y coordinates through regression based on classification through anchors and relative position values with respect to the anchor, and Z coordinates and direction using regression.

In discontinuous (discrete) acquired data other than continuously acquired learning data, when positioning is performed using only classification, there is a problem that the position value between the discontinuous data cannot be corrected.

In addition, in the case of positioning using regression, if there are distant locations having a similar appearance, there is a problem that accurate positioning is not achieved as the intermediate value is returned.

The above information disclosed in this Background section is only for enhancement of understanding of the background of the disclosure, and therefore it may contain information that does not form the prior art that is already known in this country to a person of ordinary skill in the art.

SUMMARY OF THE INVENTION

The problem to be solved by the present disclosure is to provide an apparatus and a method capable of performing positioning more accurately through hard classification and soft classification.

An embodiment of the present disclosure provides a method for image-based positioning to predict a camera pose from image data. The method includes: obtaining, by a positioning apparatus, a prediction result indicating which cell the image data belongs to among cells constituting a space for positioning from a classification network that processes the image data based on a pre-learned weight; obtaining, by the positioning apparatus, map information on the space for positioning by using a cell index selected based on the prediction result, wherein the map information includes minimum and maximum values of coordinates constituting a cell for each cell index, and a cell size; and calculating, by the positioning apparatus, a position of the image data based on the map information and outputting a corresponding camera pose.

In an implementation, the outputting of a camera pose may include calculating a position of the image data based on a weighted sum of positions in neighboring cells of the selected cell index in the space for positioning.

In an implementation, a cell constituting the space for positioning may be mapped to one class, and the prediction result may include confidence for each class, wherein the outputting of a camera pose may include outputting of the camera pose and confidence corresponding thereto.

In an implementation, the obtaining of map information may include: selecting a class having highest confidence among the confidence for each class, and obtaining a cell index mapped to the selected class; and obtaining map information on the space for the positioning by using the obtained cell index.

In an implementation, the classification network may be learned through hard classification-based learning, the hard classification-based learning may be performed by converting training data into an index for applying camera pose classification and performing hard labeling for learning on each index, and the hard labeling may be performed by setting only one index cell corresponding to a camera pose to "1" and setting the rest to "0".

In an implementation, a cell constituting the space for positioning may be mapped to one class, the prediction result may include a score for each class, and the score is an evaluation score calculated based on a loss function, wherein the obtaining of map information may include: selecting a class having a highest score among the scores for each class, and obtaining a cell index mapped to the selected class; and obtaining map information on the space for the positioning by using the obtained cell index.

In an implementation, the classification network may be learned through soft classification-based learning, the soft classification-based learning may be performed by converting training data into indexes for applying camera pose classification and performing soft labeling for learning on each index, and the soft labeling may be based on a linear interpolation method.

In an implementation, the soft labeling may determine a soft label based on a distance and an area of a neighboring cell adjacent to an absolute location.

Another embodiment of the present disclosure provides an apparatus for image-based positioning to predict a camera pose from image data. The apparatus includes: an interface device configured to receive image data for image-based positioning; a memory in which map information on cells constituting a space for positioning is stored, wherein the map information includes minimum and maximum values of coordinates constituting a cell for each cell index, and a cell size; and a processor configured to predict a camera pose based on the image data, wherein the processor is configured to perform operations by: obtaining, through the interface device, a prediction result indicating which cell the image data belongs to among cells constituting a space for positioning from a classification network learned based on hard classification; obtaining map information on the space for positioning by using a cell index selected based on the prediction result; and calculating a location for the image data based on the map information and outputting a corresponding camera pose.

In an implementation, the processor may be configured to calculate a position for the image data based on a sum of weights of neighboring cells of the selected cell index in the space for positioning when performing the operation of outputting a camera pose.

In an implementation, cells constituting the space for positioning may be mapped to one class, and the prediction result may include confidence for each class, wherein the processor may be configured to output the camera pose and confidence corresponding thereto when performing an operation of outputting a camera pose.

In an implementation, when performing the operation of obtaining map information, the processor may be configured to perform operation by: selecting a class having highest confidence among the confidence for each class, and obtaining a cell index mapped to the selected class; and obtaining map information on the space for positioning by using the obtained cell index.

In an implementation, the classification network may be learned through hard classification-based learning, the hard classification-based learning may be performed by converting training data into an index for applying camera pose classification and performing hard labeling for learning on each index, and the hard labeling may be performed by setting only one index cell corresponding to a camera pose to "1" and setting the rest to "0".

In an implementation, a cell constituting the space for positioning may be mapped to one class, the prediction result includes a score for each class, and the score is an evaluation score calculated based on a loss function, wherein when performing the operation of obtaining map information, the processor may be configured to perform operation by: selecting a class having a highest score among the scores for each class, and obtaining a cell index mapped to the selected class; and obtaining map information on the space for the positioning by using the obtained cell index.

In an implementation, the classification network may be learned through soft classification-based learning, the soft classification-based learning may be performed by converting training data into indexes for applying camera pose classification and performing soft labeling for learning on each index, and the soft labeling may be based on a linear interpolation method.

In an implementation, the processor may be configured to include: a hard classification layer unit configured to output a hard classification result including a camera pose predicted for the image data and confidence corresponding thereto by performing the operation of obtaining a prediction result by using a classification network learned through hard classification-based learning, the operation of obtaining map information, and the operation of outputting a corresponding camera pose; a soft classification layer unit configured to output a soft classification result including a camera pose predicted for the image data by performing the operation of obtaining a prediction result by using a classification network learned through soft classification-based learning, the operation of obtaining map information, and the operation of outputting a corresponding camera pose; and a fusion processing unit configured to output a final camera pose predicted for the image data by converging the hard classification result and the soft classification result.

In an implementation, the processor may be configured to include: a hard classification layer unit configured to output a hard classification result including a camera pose predicted for the image data and confidence corresponding thereto by performing the operation of obtaining a prediction result by using a classification network learned through hard classification-based learning, the operation of obtaining map information, and the operation of outputting a corresponding camera pose; a regression layer unit configured to output a regression estimation result including a camera pose predicted for the image data through regression estimation; and a fusion processing unit configured to output a final camera pose predicted for the image data by converging the hard classification result and the regression estimation result.

In an implementation, the processor may be configured to include: a soft classification layer unit configured to output a soft classification result including a camera pose predicted for the image data by performing the operation of obtaining a prediction result by using a classification network learned through soft classification-based learning, the operation of obtaining map information, and the operation of outputting a corresponding camera pose; a regression layer unit configured to output a regression estimation result including a camera pose predicted for the image data through regression estimation; and a fusion processing unit configured to output a final camera pose predicted for the image data by converging the soft classification result and the regression estimation result.

In an implementation, the processor may be configured to include: a hard classification layer unit configured to output a hard classification result including a camera pose predicted for the image data and confidence corresponding thereto by performing the operation of obtaining a prediction result by using a classification network learned through hard classification-based learning, the operation of obtaining map information, and the operation of outputting a corresponding camera pose; a soft classification layer unit configured to output a soft classification result including a camera pose predicted for the image data by performing the operation of obtaining a prediction result by using a classification network learned through soft classification-based learning, the operation of obtaining map information, and the operation of outputting a corresponding camera pose; a regression layer unit configured to output a regression estimation result including a camera pose predicted for the image data through regression estimation; and a fusion processing unit configured to output a final camera pose predicted for the image data by converging the soft classification result, the hard classification result, and the regression estimation result.

DETAILED DESCRIPTION OF THE EMBODIMENTS

Figure 1:
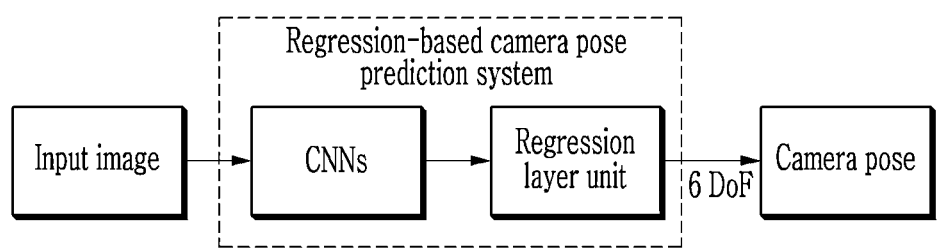
FIG. 1 is a diagram illustrating the concept of positioning using image-based deep learning.

In the following detailed description, only certain embodiments of the present disclosure have been shown and described, simply by way of illustration. Hereinafter, embodiments of the present disclosure will be described in detail with reference to the accompanying drawings so that those of ordinary skill in the art may easily implement the present disclosure. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, in addition, unless explicitly described to the contrary, the word "comprise", and variations such as "comprises" or "comprising", will be understood to imply the inclusion of stated elements but not the exclusion of any other elements.

The expressions described in the singular may be interpreted as singular or plural unless an explicit expression such as "one", "single", and the like is used.

In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, a first component may be referred to as a second component, and similarly, the second component may be referred to as the first component.

Hereinafter, an apparatus and a method for image classification based positioning according to an embodiment of the present disclosure will be described with reference to the drawings.

FIG. 1 is a diagram illustrating the concept of positioning using image-based deep learning.

Conventionally, as shown in FIG. 1, when an image is input, six parameters (e.g., 6 Degrees of Freedom (DoF), x, y, z, qx, qy, qz) are estimated through regression in a regression-based camera pose prediction system. x, y, and z represent a three-dimensional position, and qx, qy, and qz represent quaternions in log units.

However, methods for deep learning-based image-based positioning, which are performed by estimating six parameters only by regression, are not efficient and accurate, and in particular, it is more efficient to use classification for discontinuous (discrete) acquired data rather than continuously acquired learning data. However, when only classification is used, there is a problem that the position value between discontinuous data cannot be corrected.

In an embodiment of the present disclosure, image-based positioning is performed through hard classification and soft classification.

First, image-based positioning based on hard classification according to an embodiment of the present disclosure will be described.

In order to predict the camera pose through classification, the space for positioning must first be divided into certain areas.

Figure 2:
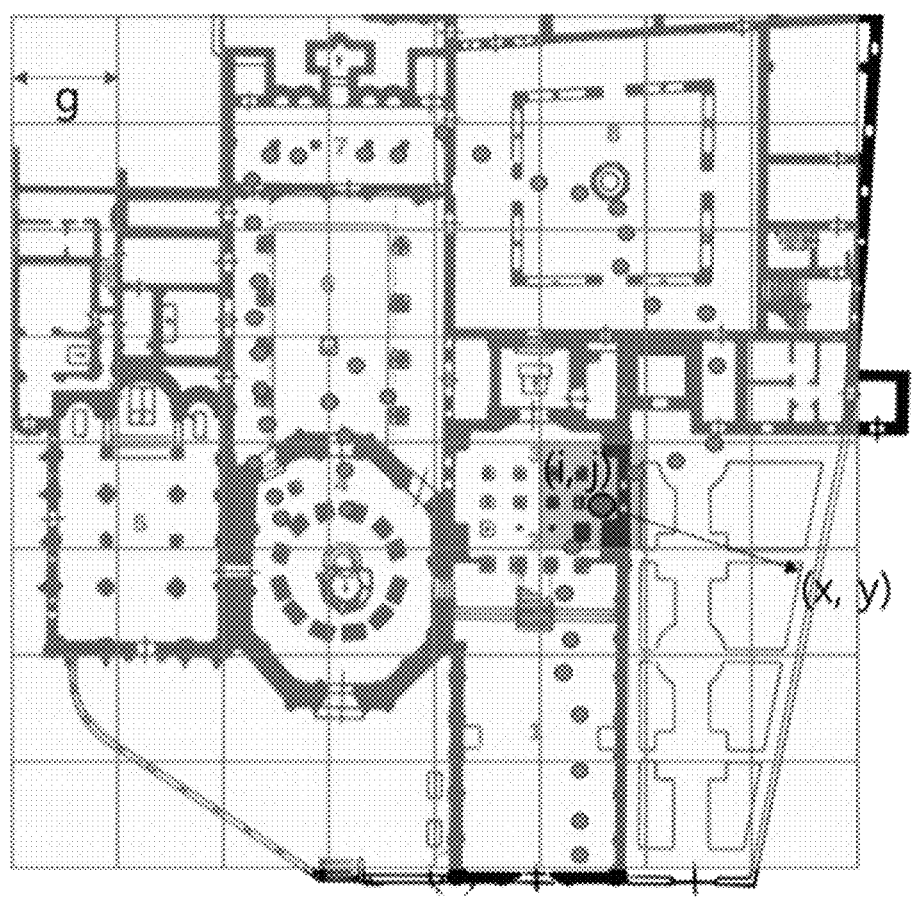
FIG. 2 is an exemplary view illustrating a space for positioning according to an embodiment of the present disclosure.

FIG. 2 is an exemplary view illustrating a space for positioning according to an embodiment of the present disclosure.

A space for positioning, for example, a map, is uniformly divided into cells of a certain size as illustrated in FIG. 2, and a direction is also divided into several areas through quantization. Each location and direction is mapped to a class identity (ID). As shown in FIG. 2, assuming two dimensions, (x, y) are the actual absolute position values, (i, j) are the index of the cell quantized by the absolute position value, and the cell index is mapped to one class. In this case, the parameters for quantization include a minimum value, a maximum value, and a grid size. Here, the minimum and maximum values represent the minimum and maximum values of the (x, y) coordinates of the space to be positioned, and the grid size represents the size of a cell. These parameters are stored in memory as map information.

Figure 3:
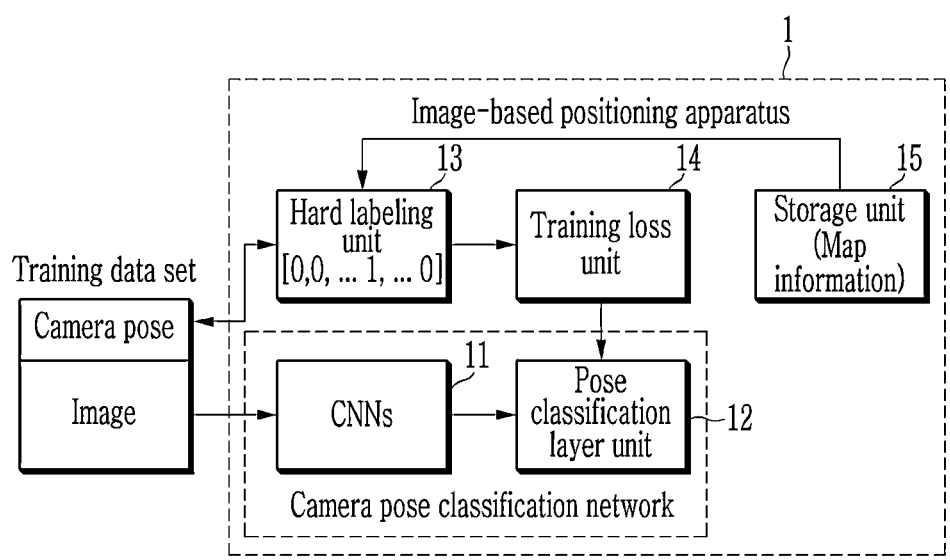
FIG. 3 is a diagram illustrating a structure for learning an image-based positioning apparatus based on hard classification according to an embodiment of the present disclosure.

FIG. 3 is a diagram illustrating a structure for learning an image-based positioning apparatus based on hard classification according to an embodiment of the present disclosure.

The image-based positioning apparatus 1 based on hard classification according to an embodiment of the present disclosure includes, as shown in FIG. 3, a convolutional neural network (CNN) unit 11, a pose classification layer unit 12, a hard labeling for learning unit 13, a training loss unit 14, and a storage unit 15.

The CNN unit 11 and the pose classification layer unit 12 constitute a camera pose classification network, and perform learning based on input data.

The storage unit 15 stores information on a space for positioning. That is, as shown in FIG. 2, map information including a minimum value, a maximum value, and a grid size (cell size) is stored in the storage unit 15, corresponding to a cell index for each cell.

The hard labeling unit 13 labels input data. Specifically, input training data is converted into an index for applying a camera pose (6 Degrees of Freedom (DoF)) classification based on the map information stored in the storage unit 15, and labeling is performed on the index. In particular, one-hot labeling is performed so that only one index cell corresponding to the camera pose is set to "1" and the rest are set to "0".

The training loss unit 14 provides a classification loss function and the labeled data provided from the hard labeling unit 13, that is, labeled data (which may also be referred to as label), which is a result value that must be predicted for the data input for training to the camera pose classification network. Training data (e.g. video) and a label (e.g. camera pose) corresponding to the training data may constitute one training data set.

The camera pose classification network including the CNN unit 11 and the pose classification layer unit 12 is learned through the classification loss function.

Figure 4:
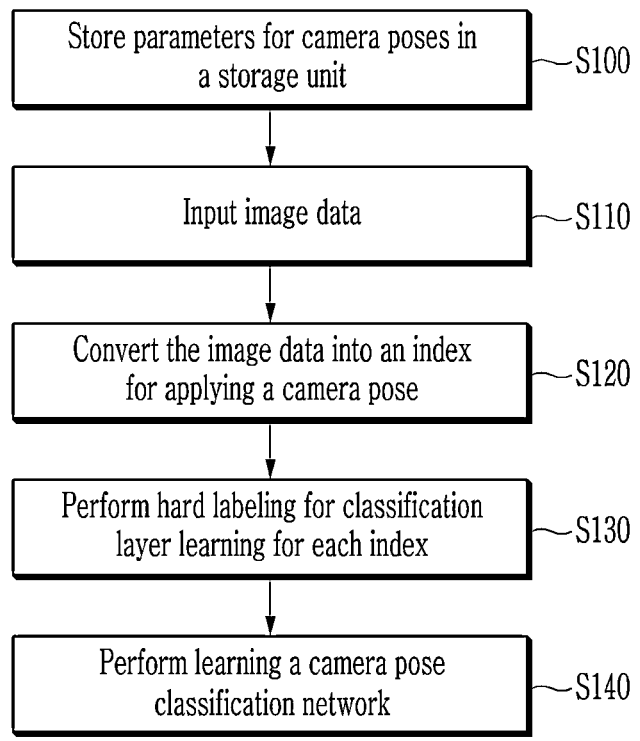
FIG. 4 is a flowchart of a learning method for image-based positioning based on hard classification according to an embodiment of the present disclosure.

FIG. 4 is a flowchart of a learning method for image-based positioning based on hard classification according to an embodiment of the present disclosure.

As shown in FIG. 4, map information including parameters for the camera pose of the training data set, that is, a minimum value, a maximum value, and a grid size (cell size), is stored in the storage unit 15 for each cell index (S100).

Data of the training data set, that is, image data, is input to the image-based positioning apparatus 1 (S110). The image data is input to the camera pose classification network and the hard labeling unit 13.

The image data is converted into an index for applying the camera pose (6 DoF) classification (S120). And, for each index, hard labeling for classification layer learning is performed (S130). That is, one-hot labeling is performed for the indexes so that only one index cell corresponding to the camera pose is set to "1" and the rest are set to "0".

Next, learning is performed through the camera pose classification network (S140), and the weight of the CNN unit 11 is adjusted according to the learning result. That is, in the camera pose classification network, the CNN unit 11 learns input image data and outputs the predicted results of the class corresponding to each position, and the prediction result includes the confidence of a prediction value for each class. When the learning is complete, based on the classification loss function and the labeled data provided from the training loss unit 14, the pose classification layer unit 12 repeatedly performs neural network learning by the gradient back propagation based on the loss function values which are produced by applying the predicted class to the classification loss function.

The camera pose may be predicted from the input image data based on the learned camera pose classification network.

Figure 5:
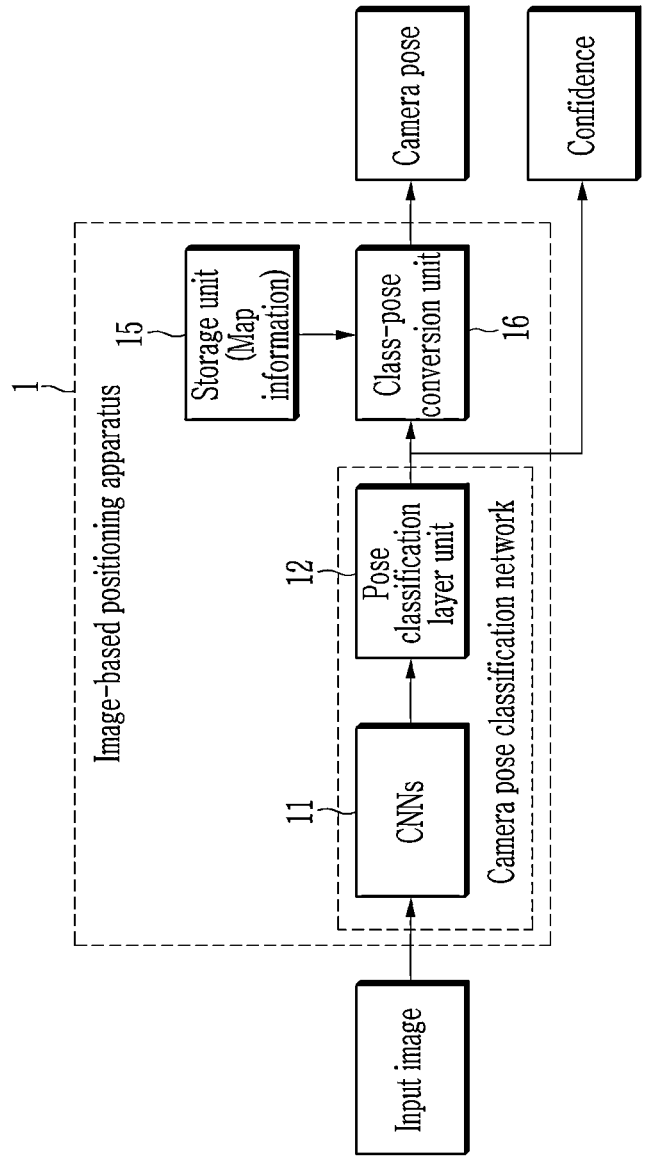
FIG. 5 is a diagram illustrating a structure for prediction of an image-based positioning apparatus based on hard classification according to an embodiment of the present disclosure.

FIG. 5 is a diagram illustrating a structure for prediction of an image-based positioning apparatus based on hard classification according to an embodiment of the present disclosure.

In the image-based positioning apparatus 1 according to an embodiment of the present disclosure, for prediction, as shown in FIG. 5, a CNN unit 11 and a pose classification layer unit 12 which constitute a camera pose classification network, a storage unit 14, and a class-pose conversion unit 16 are included.

The camera pose classification network is a learned network, and outputs a camera pose prediction result for input data, and the prediction result includes confidence for each class of input data.

The class-pose conversion unit 16 outputs a final absolute position, that is, a camera pose, using the prediction result of the camera pose classification network and the map information stored in the storage unit 14. The final absolute position is obtained by calculating the absolute position corresponding to the cell index mapped to the class having the highest confidence value based on map information. Alternatively, a final absolute position may be calculated based on the sum of weights with neighboring cells.

Figure 6:
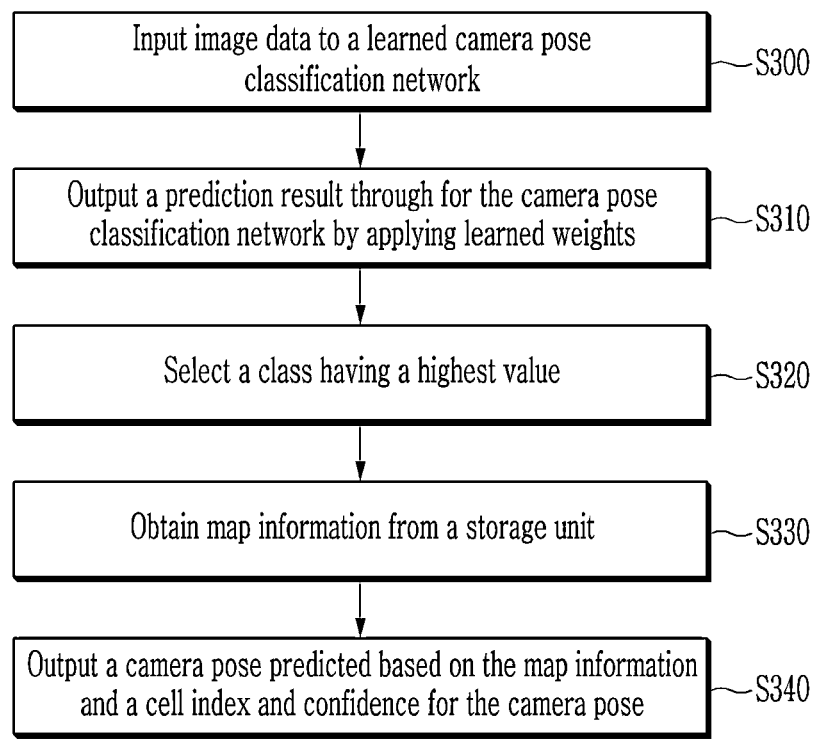
FIG. 6 is a flowchart of a prediction method based on hard classification according to an embodiment of the present disclosure.

FIG. 6 is a flowchart of a prediction method based on hard classification according to an embodiment of the present disclosure.

Image data is input to the learned camera pose classification network as described above (S300).

The learned camera pose classification network outputs a prediction result for the input image data by applying the learned weight (S310). The prediction result includes confidence for each class, and a class having the highest confidence value is selected (S320).

Then, the class-pose conversion unit 16 obtains the corresponding map information from the storage unit 15 using the cell index corresponding to the selected class (S330), and outputs a camera pose which is predicted for the image data based on the obtained map information and the cell index and a confidence level for the camera pose (S340). Specifically, map information, that is, a minimum value, a maximum value, and a cell size from the storage unit 15 in which the parameters for the camera pose of the training data set are stored are obtained. Then, the final absolute position mapped to the cell index of the selected class is calculated based on the minimum value, the maximum value, and the cell size. Alternatively, the final absolute position may be calculated based on the sum of the weights of neighboring cells of the cell index of the selected class. For example, when the cell index of the selected class is (2, 3), the minimum value is (0 m, 0 m), the maximum value is (10 m, 10 m), and the cell size is 2, the absolute position is (5 m, 7 m). That is, each cell index has corresponding absolute position coordinates. If the cell index is (0, 0), the absolute position coordinates are (1 m, 1 m), if the cell index is (4, 4), the absolute position coordinates are (9 m, 9 m), and if the cell index is (3), the absolute position coordinates are (7 m, 7 m), and so on. These absolute position coordinates are used for the final absolute position. On the other hand, the method of calculating absolute positions based on the sum of the weights of neighboring cells of the cell index multiplies the absolute position coordinates mapped to each index corresponding to the neighboring cells of the cell index by the confidence of predicted class, and then adds all of the multiplied values to output it as the final absolute position. Thereafter, the final absolute position, that is, the camera pose (6 DoF) into which the final absolute position is converted using the map information, and the confidence for this (the confidence of the class corresponding to the final absolute position), are output.

Next, image-based positioning based on soft classification according to an embodiment of the present disclosure will be described.

The input of the neural network for image-based positioning using soft classification is a single image, and the final output consists of the index of the cell corresponding to the absolute position and direction, and the weight values for neighboring cells of the index.

In order to predict the camera pose through soft classification, similar to the image-based positioning based on the hard classification above, the space for positioning is divided into predetermined areas.

Figure 7:
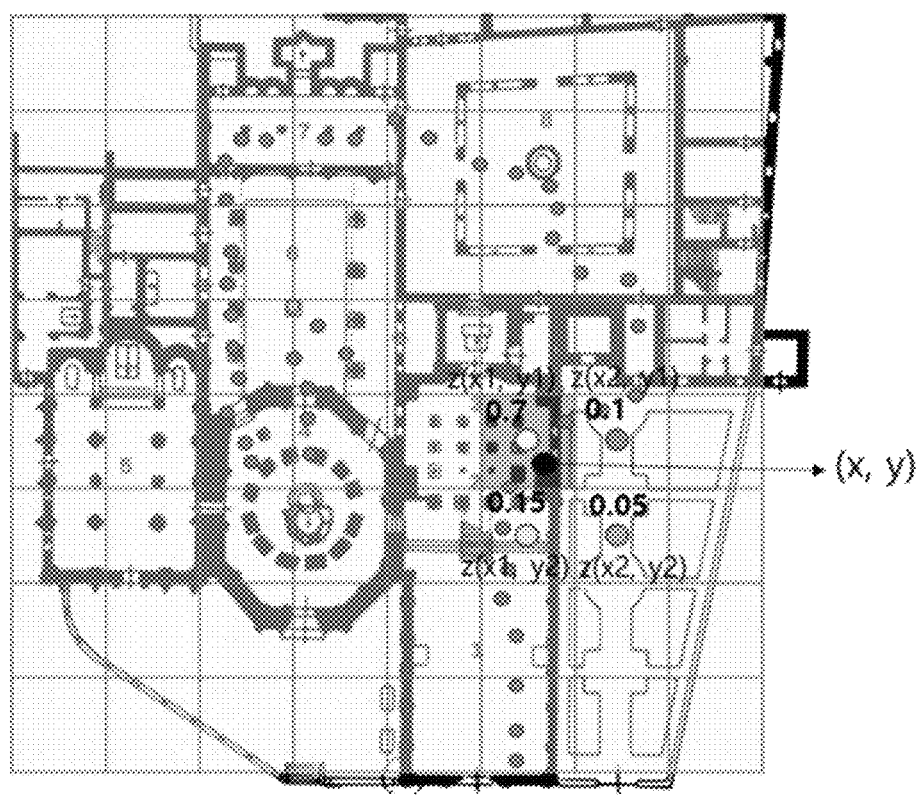
FIG. 7 is an exemplary view illustrating a space for positioning according to another embodiment of the present disclosure.

FIG. 7 is an exemplary view illustrating a space for positioning according to another embodiment of the present disclosure.

A space for positioning, for example, a map, is uniformly divided into cells of a certain size as illustrated in FIG. 7 so that one cell represents one class. That is, each position and direction is mapped to one class ID. As shown in FIG. 7, assuming 2D, (x, y) is an actual absolute position value. The absolute position value (x, y) can be expressed using a linear interpolation method. (i, j) is the index of the cell quantized by the absolute position value, and the cell index is mapped to one class. Here, the parameters for quantization include a minimum value, a maximum value, and a grid size (cell size).

Figure 8:
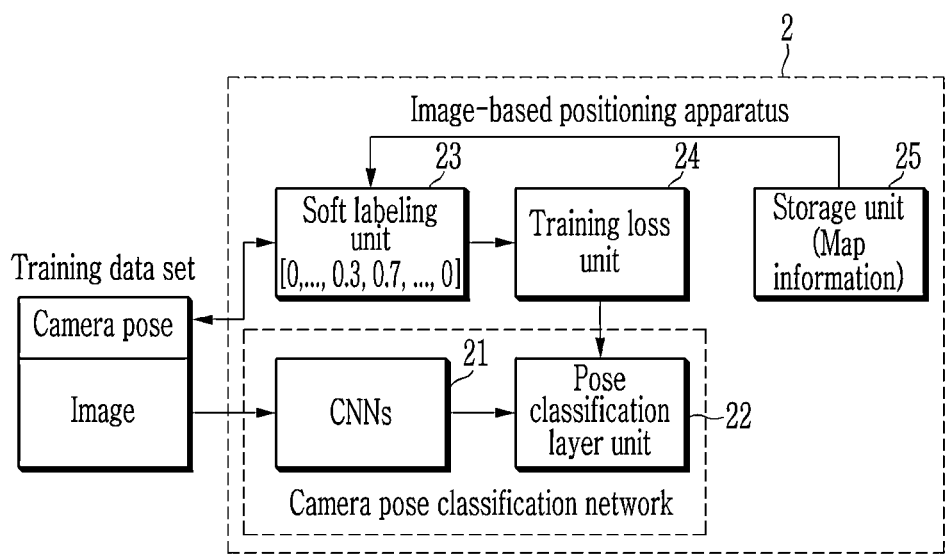
FIG. 8 is a diagram illustrating a structure for learning an image-based positioning apparatus based on soft classification according to an embodiment of the present disclosure.

FIG. 8 is a diagram illustrating a structure for learning an image-based positioning apparatus based on soft classification according to an embodiment of the present disclosure.

The image-based positioning apparatus 2 based on soft classification according to an embodiment of the present disclosure includes, as shown in FIG. 8, a CNN unit 21, a pose classification layer unit 22, a soft labeling unit 23, a training loss unit 24, and a storage unit 25.

The CNN unit 21 and the pose classification layer unit 22 constitute a camera pose classification network, and perform learning based on input data.

The storage unit 25 stores information on a space for positioning. That is, as shown in FIG. 7, map information including a minimum value, a maximum value, and a grid size (cell size 0 is stored in the storage unit 25, corresponding to the cell index for each cell.

The soft labeling unit 23 labels input data. The input training data is converted into an index for applying camera pose (6 DoF) classification based on map information stored in the storage unit 55, and labeling is performed on the index. In this case, the soft label is calculated using the linear interpolation method, and the soft label is determined by calculating the distance and area of the neighboring cells. For example, in FIG. 7, (x, y) is an actual absolute position value, and soft labels of four neighboring cells are calculated based on the absolute position value. Function z is a function that receives the absolute position and returns the index of the cell. Assuming that the absolute position of four neighboring cells is (x1, y1), (x1, y2), (x2, y1), and (x2, y2), respectively, the absolute position value (x, y) may be expressed using linear interpolation. Through this, the soft label of the neighboring cell is obtained. For example, soft labels of 0.7, 0.15, 0.1, and 0.05 are obtained for (x1, y1), (x1, y2), (x2, y1), and (x2, y2), respectively.

The training loss unit 24 provides the classification loss function and labeled data provided from the soft labeling unit 23 to the camera pose classification network. Training data (e.g. video) and a label (e.g. camera pose) corresponding to the training data may constitute one training data set.

The camera pose classification network including the CNN unit 21 and the pose classification layer unit 22 is learned through a classification loss function. For example, it is learned using the loss function using Kullback-Leibler divergence.

Figure 9:
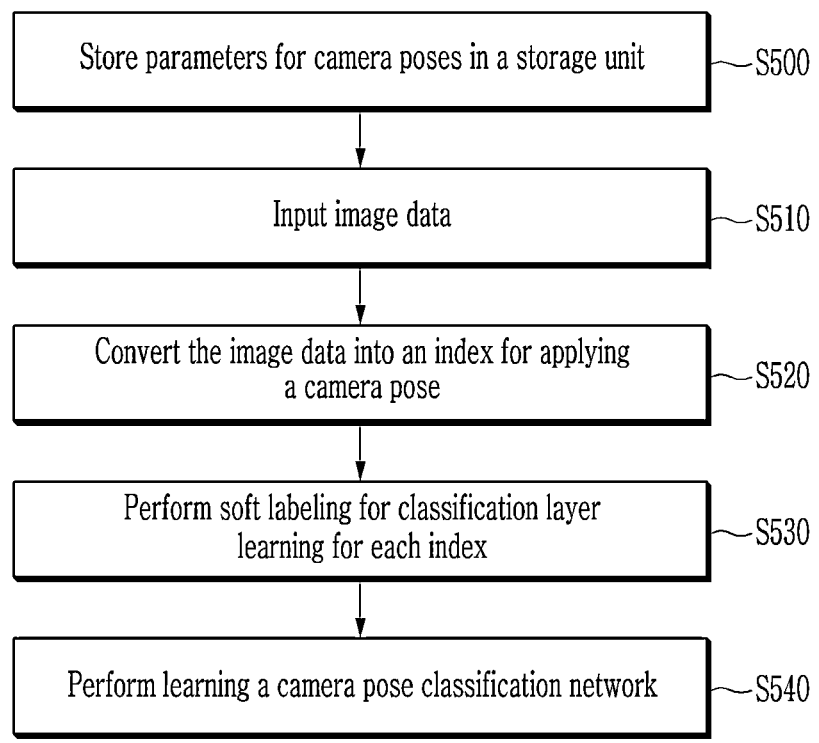
FIG. 9 is a flowchart of a learning method for image-based positioning based on soft classification according to an embodiment of the present disclosure.

FIG. 9 is a flowchart of a learning method for image-based positioning based on soft classification according to an embodiment of the present disclosure.

As shown in FIG. 9, parameters for a camera pose, that is, map information including a minimum value, a maximum value, and a grid size (cell size) is stored in the storage unit 25 for each cell index (S500).

Data of the training data set, that is, image data, is input to the image-based positioning apparatus 2 (S310). The image data is input to the camera pose classification network and the soft labeling unit 23.

The image data is converted into an index for applying the camera pose (6 DoF) classification (S320). Then, for each index, soft labeling for the classification layer learning is performed (S330). That is, as described above for input indices, a soft label for each index is calculated using a linear interpolation method based on an absolute position value.

Next, learning is performed through the camera pose classification network (S340), and the weight of the CNN unit 21 is adjusted according to the learning result. That is, in the camera pose classification network, the CNN unit 21 learns input image data and outputs the predicted result, and the prediction result includes the confidence of a prediction value for each class. When the learning is complete, based on the classification loss function and the labeled data (soft label) provided from the training loss unit 24, the pose classification layer unit 22 repeatedly updates a neural network (the CNN) based on the loss function values which are produced by applying the predicted class to the classification loss function.

For soft classification labels, unlike hard classification, the neural network is learned using the Kullback-Leibler emission loss function.

The camera pose may be predicted from image data input based on the learned camera pose classification network.

Figure 10:
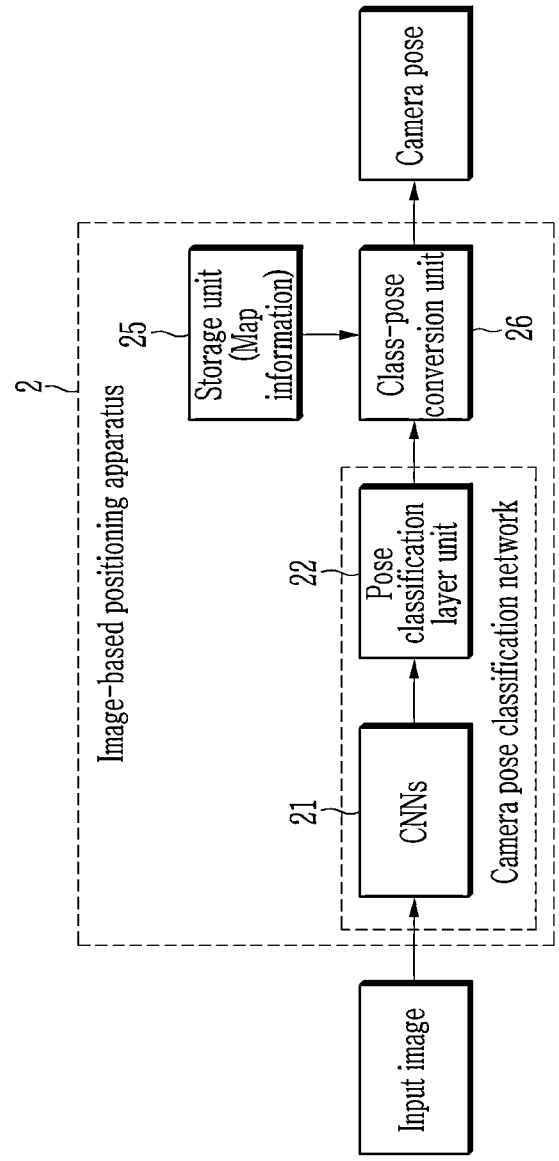
FIG. 10 is a diagram illustrating a structure for prediction of an image-based positioning apparatus based on soft classification according to an embodiment of the present disclosure.

FIG. 10 is a diagram illustrating a structure for prediction of an image-based positioning apparatus based on soft classification according to an embodiment of the present disclosure.

In the image-based positioning apparatus 2 according to an embodiment of the present disclosure, for prediction, as shown in FIG. 10, a CNN unit 21 and a pose classification layer unit 22 which constitute a camera pose classification network, a storage unit 24, and a class-pose conversion unit 26 are included.

The camera pose classification network is a learned network and outputs a prediction result of camera pose for input data, and the prediction result includes scores for each class by classifying the input data. Here, the score represents the evaluation score obtained based on the loss function.

The class-pose conversion unit 26 outputs a final absolute position, that is, a camera pose, using the predicted result of the camera pose classification network and the map information stored in the storage unit 24.

The final absolute position is obtained as the sum of the weights for the absolute position value of the neighboring cell centered on the cell with the highest weight. For example, when w(c) is the score of the index c, the final absolute position value can be calculated as the sum of the weights of the positions using scores of the neighboring cells of the index having the highest score. For example, when the cell index of the selected class is (2, 3), the minimum value is (0 m, 0 m), the maximum value is (10 m, 10 m), and the cell size is 2, each cell index has corresponding absolute position coordinates. That is, if the cell index is (0, 0) the absolute position coordinates are (0 m, 0 m), if the cell index is (5, 5), the absolute position coordinates are (10 m, 10 m), and if the cell index is (3, 3) the absolute position coordinates are (6 m, 6 m). The method of calculating the absolute position based on the sum of the weights with neighboring neighbor cells multiplies the coordinates mapped to each index corresponding to the neighboring cells of the cell index by the confidence of predicted class, and then adds all of the multiplied values to output it as the final absolute position. For example, when the last selected cell index is (2, 3) and the corresponding absolute position coordinates are (5 m, 7 m), and the score is 0.5, it assumed that the cell index of the cell to the left of the selected cell is (2, 2), the cell index of the cell to the right of the selected cell is (2, 4), the cell index of the cell to the upper of the selected cell is (1, 3), the cell index of the cell to the lower of the selected cell is (3, 3), the absolute position coordinates for each of these neighboring cells are (5 m, 5 m), (5 m, 9 m), (3 m, 7 m), and (7 m, 7 m), respectively, and the scores corresponding to each of these neighboring cells are 0.1, 0.1, 0.2, and 0.1, respectively. The final absolute position value is calculated according to "0.5×(5, 7)+0.1×(5, 5)+0.1×(5, 9)+0.2×(3, 7)+0.1×(7, 7)", and becomes (4.8 m, 7 m).

At this time, the absolute position value of each cell is obtained by storing the minimum and maximum values of each parameter during learning, and using the cell size as a hyper-parameter, and the function that converts the cell index to the corresponding absolute position is expressed as $k=z(x,y)$, and its inverse function that converts the absolute position to the cell index is expressed as $(x,y)=z^{-1}(k)$. A height direction is omitted for simplicity. This can be expressed as an equation as follows.

$$(x, y) = \sum_{(x', y') \in \mathcal{N}(z^{-1}(k))} w(z(x', y')) \cdot (x', y') \qquad \text{Equation 1}$$

Here, $k=\text{argmax}_c w(c)$, w is predicted weights for the cell indices, $N(x,y)$ is a set of coordinates in neighboring cells of $(x,y)$ (e.g. 4-neighbors).

Figure 11:
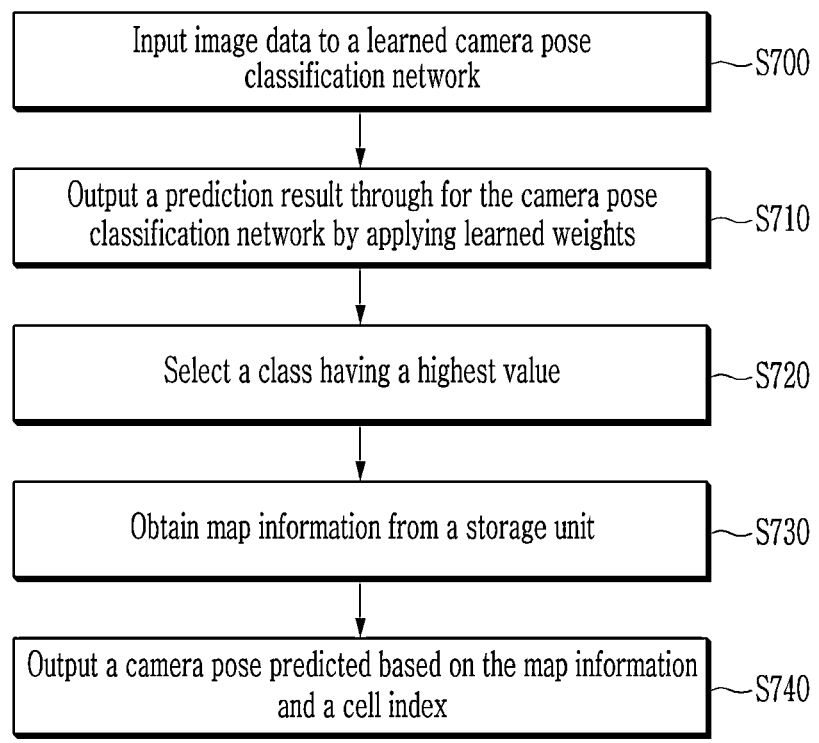
FIG. 11 is a flowchart of a prediction method based on hard classification according to an embodiment of the present disclosure.

FIG. 11 is a flowchart of a prediction method based on hard classification according to an embodiment of the present disclosure.

Image data is input to the learned camera pose classification network as described above (S700).

The learned camera pose classification network outputs a prediction result for the input image data by applying the learned weight (S710). The prediction result includes scores for each class, and a class having the highest score is selected (S720).

Then, the class-pose conversion unit 26 acquires the corresponding map information from the storage unit 15 using the cell index corresponding to the selected class (S730), and outputs the camera pose for the input image data based on the obtained map information and the cell index (S740). Specifically, map information mapped to the cell index of the selected class, that is, a minimum value, a maximum value, and a cell size from the storage unit 15 in which the parameters for the camera pose of the training data set are stored are obtained. Then, the final absolute position is calculated based on the minimum value, the maximum value, and the cell size. That is, the sum of the weights for the absolute position value of the neighboring cell centered on the selected cell index, that is, the cell with the highest weight is calculated and then is used as the final absolute position. Thereafter, the final absolute position, that is, the camera pose (6 DoF) into which the final absolute position is converted using the map information is output.

According to an embodiment of the present disclosure, various types of image classification based positioning apparatuses may be provided by using the hard classification-based positioning apparatus and the soft classification-based positioning apparatus as described above.

Figure 12:
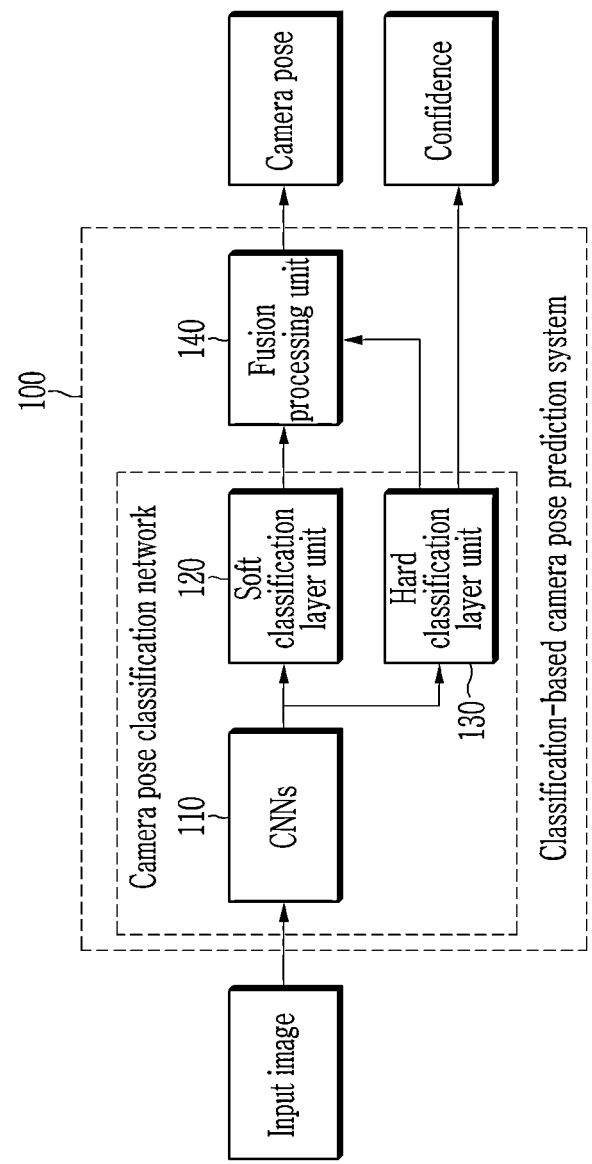
FIG. 12 is a diagram illustrating a structure of an apparatus for image classification based positioning according to an embodiment of the present disclosure.

FIG. 12 is a diagram illustrating a structure of an apparatus for image classification based positioning according to an embodiment of the present disclosure.

The apparatus for image classification based positioning (also referred to as a classification-based camera pose prediction system) 100 according to an embodiment of the present disclosure includes, as shown in FIG. 12, a CNN unit 110, a soft classification layer unit 120, a hard classification layer unit 130, and a fusion processing unit 140.

Here, the soft classification layer unit 120 corresponds to the image-based positioning apparatus 2 based on soft classification described above, and the hard classification layer unit 130 corresponds to the image-based positioning apparatus 1 based on hard classification described above. That is, the soft classification layer unit 120 performs soft classification based on the predicted result of the CNN unit 110 on the input image data and outputs a final absolute position value corresponding to the camera pose, and the hard classification layer unit 130 performs hard classification based on the predicted result of the CNN unit 110 on the input image data and outputs a final absolute position value and confidence corresponding to the camera pose.

The fusion processing unit 140 outputs a camera pose, which is a final result of image data, based on the final absolute position value of the soft classification layer unit 120 and the final absolute position value of the hard classification layer unit 130. In addition, the fusion processing unit 140 outputs the confidence from the hard classification layer unit 130.

With the exception of the weights of the neighboring cells according to the results of the hard classification or the neighboring cells of the previously predicted position values, the weights of the distant cells shall be zeroed. Normalization allows the sum of non-zero weights to be equal to 1, and then the final absolute position value can be determined. In addition, if the confidence value of the hard classification is very low, convergence is possible by selecting the soft classification results.

Figure 13:
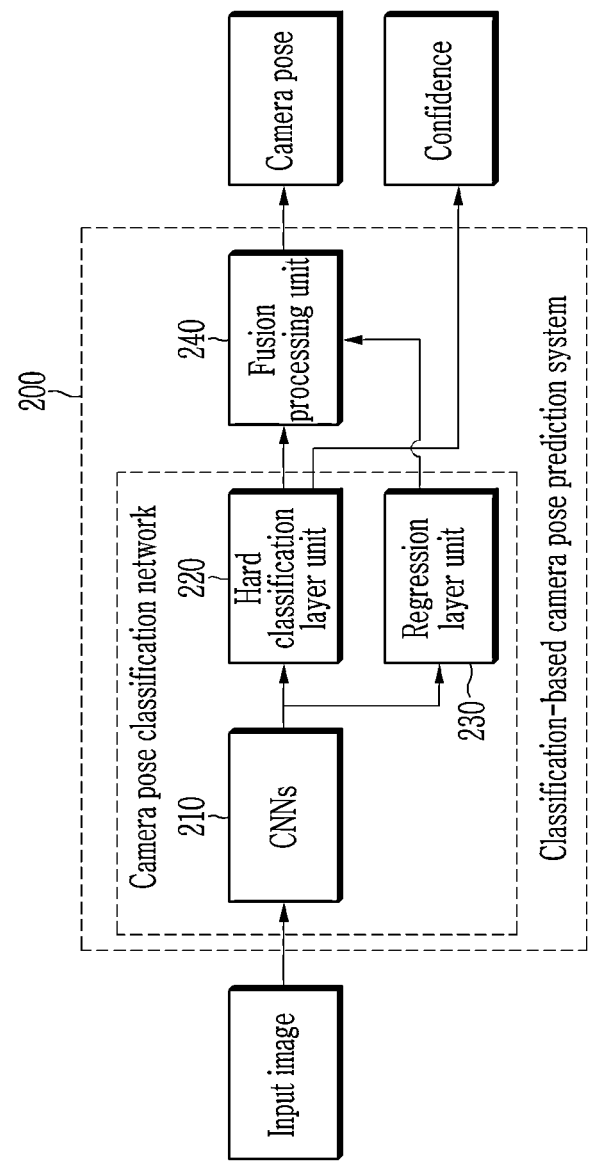
FIG. 13 is a diagram illustrating a structure of an apparatus for image classification based positioning according to another embodiment of the present disclosure.

FIG. 13 is a diagram illustrating a structure of an apparatus for image classification based positioning according to another embodiment of the present disclosure.

An apparatus for image classification based positioning (also referred to as a classification-based camera pose prediction system) 200 according to another embodiment of the present disclosure includes, as shown in FIG. 13, a CNN unit 210, a hard classification layer unit 220, a regression layer unit 230, and a fusion processing unit 240.

Here, the hard classification layer unit 220 corresponds to the image-based positioning apparatus 1 based on hard classification described above. The hard classification layer unit 220 performs hard classification based on the predicted result of the CNN unit 210 on the input image data, and outputs a final absolute position value and confidence corresponding to the camera pose.

The regression layer unit 220 estimates a camera pose through regression based on a predicted result of the CNN unit 210 for input image data, and outputs a final absolute position value corresponding to the estimation result.

The fusion processing unit 240 outputs a camera pose, which is a final result of the image data, based on the final absolute position value of the hard classification layer unit 220 and the final absolute position value of the regression classification layer unit 220. If the confidence value of the hard classification is very low, convergence is possible by selecting the soft classification results. Additionally, the fusion processing unit 240 outputs the confidence from the hard classification layer unit 220.

Figure 14:
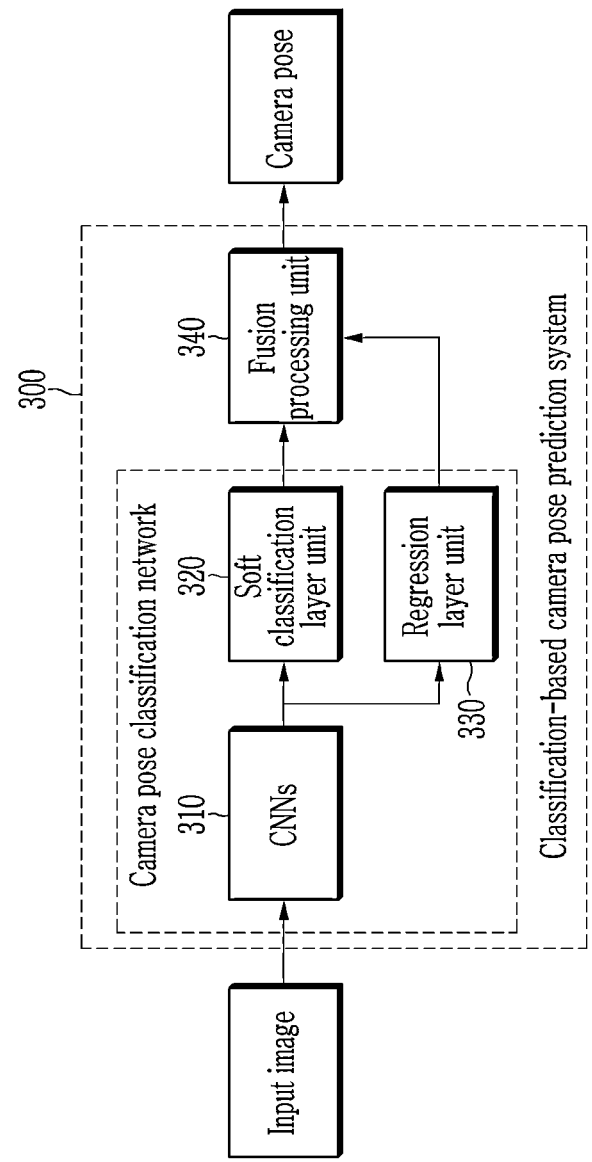
FIG. 14 is a diagram illustrating a structure of an apparatus for image classification based positioning according to another embodiment of the present disclosure.

FIG. 14 is a diagram illustrating a structure of an apparatus for image classification based positioning according to another embodiment of the present disclosure.

An apparatus for image classification based positioning (also referred to as a classification-based camera pose prediction system) 300 according to another embodiment of the present disclosure includes, as shown in FIG. 14, a CNN unit 310, a soft classification layer unit 320, a regression layer unit 330, and a fusion processing unit 340.

Here, the soft classification layer unit 320 corresponds to the image-based positioning apparatus 2 based on soft classification described above. The soft classification layer unit 320 performs soft classification based on the predicted result of the CNN unit 310 on the input image data, and outputs a final absolute position value corresponding to a camera pose.

The regression layer unit 330 estimates a camera pose through regression based on a predicted result of the CNN unit 310 for input image data, and outputs a final absolute position value corresponding to the estimation result.

The fusion processing unit 340 outputs a camera pose, which is a final result of the image data, based on the final absolute position value of the soft classification layer unit 320 and the final absolute position value of the regression classification layer unit 330.

Figure 15:
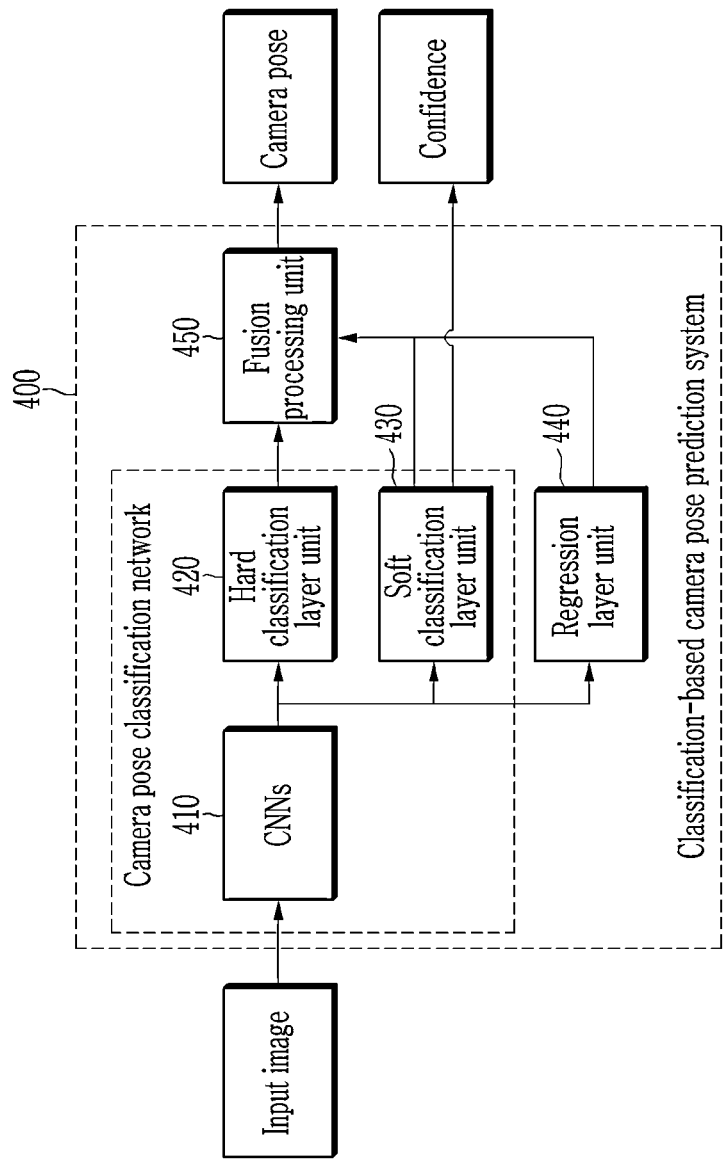
FIG. 15 is a diagram illustrating a structure of an apparatus for image classification based positioning according to another embodiment of the present disclosure.

FIG. 15 is a diagram illustrating a structure of an apparatus for image classification based positioning according to another embodiment of the present disclosure.

A image classification based positioning apparatus (also referred to as a classification-based camera pose prediction system) 400 according to another embodiment of the present disclosure includes, as shown in FIG. 15, a CNN unit 410, a hard classification layer unit 420, a soft classification layer unit 430, a regression layer unit 440, and a fusion processing unit 450.

Here, the hard classification layer unit 420 corresponds to the image-based positioning apparatus 1 based on hard classification described above. The hard classification layer unit 420 performs hard classification based on the predicted result of the CNN unit 410 on the input image data, and outputs a final absolute position value and confidence corresponding to a camera pose.

The soft classification layer unit 430 corresponds to the image-based positioning apparatus 2 based on soft classification described above. The soft classification layer unit 430 performs soft classification based on the predicted result of the CNN unit 410 on the input image data, and outputs a final absolute position value corresponding to a camera pose. The regression layer unit 440 estimates a camera pose based on the predicted result of the CNN unit 410 for input image data, and outputs a final absolute position value corresponding to the estimation result.

The fusion processing unit 440 outputs a camera pose, which is the final result of the data, based on the final absolute position value of the hard classification layer unit 420, the final absolute position value of the soft classification layer unit 430, and the final absolute position value of the regression classification layer unit 440.

With the exception of the weights of the neighboring cells according to the results of the hard classification or the neighboring cells of the previously predicted position values, the weights of the distant cells shall be zeroed. Normalization allows the sum of non-zero weights to be equal to 1 and then the final absolute position value can be determined. In addition, if the confidence value of the hard classification is very low, convergence is possible by selecting the soft classification results or the regression results.

According to these embodiments, the hard classification-based layer and the soft classification-based layer according to an embodiment of the present disclosure may be applied to any CNN, and may be used alone or together with other existing regression layers. An example in which the hard classification-based layer and the soft classification-based layer are combined with other positioning layers is not limited to the one described above.

Figure 16:
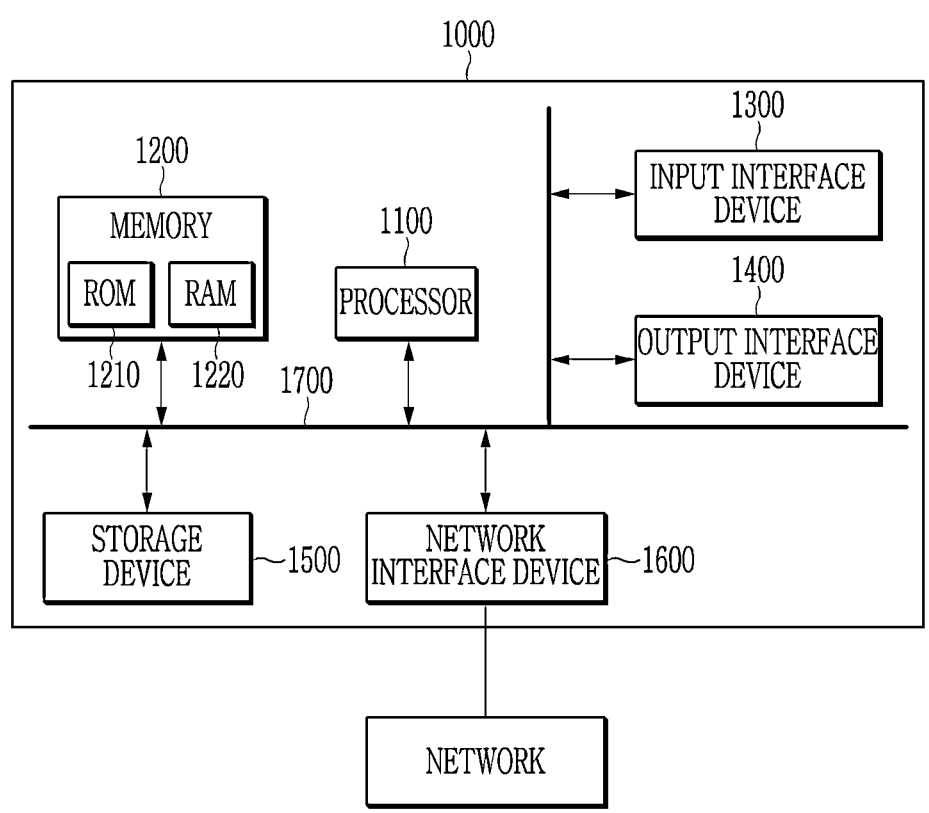
FIG. 16 is a structural diagram illustrating a computing device for implementing a method for image-based positioning according to an embodiment of the present disclosure.

FIG. 16 is a structural diagram illustrating a computing device for implementing a method for image-based positioning according to an embodiment of the present disclosure.

As shown in the accompanying FIG. 16, a method for image-based positioning according to an embodiment of the present disclosure may be implemented using the computing device 1000.

The computing device 1000 may include at least one of a processor 1100, a memory 1200, an input interface device 1300, an output interface device 1400, a storage device 1500, and a network interface 1600. Each of the components may be connected by a bus 1700 to communicate with each other. In addition, each of the components may be connected through an individual interface or an individual bus centered on the processor 1100 instead of the common bus 1600.

The processor 1100 may be implemented in various types, such as an application processor (AP), a central processing unit (CPU), a graphics processing unit (GPU), etc., and may be any semiconductor device that executes commands stored in the memory 1200 or the storage device 1500. The processor 1100 may execute a program command stored in at least one of the memory 1200 and the storage device 1500.

This processor 1100 may be configured to embody the functions and methods described based on FIGS. 2 to 15 above. For example, the processor 1100 may be configured to include at least one among a hard classification layer unit, a soft classification layer unit, a regression layer unit, and a fusion processing unit, or to perform the functions thereof.

The memory 1200 and the storage device 1500 may include various types of volatile or nonvolatile storage media. For example, the memory may include a read-only memory (ROM) 1210 and a random access memory (RAM) 1220. In an embodiment of the present disclosure, the memory 1200 may be located inside or outside the processor 1100, and the memory 1200 may be connected to the processor 1100 through various known means.

The memory 1200 or the storage device 1500 may be implemented to store map information for a cell constituting a space for positioning.

The input interface device 1300 is configured to provide data (e.g. image data) to the processor 1100, and the output interface device 1400 is configured to output data from the processor 1100.

The network interface device 1600 may transmit or receive signals with other entities through a network, such as a wireless network or a wired network.

The computing device 1000 having such a structure may be referred to as an image-based positioning apparatus or a classification-based camera pose prediction system, and may be implemented in a method for image-based positioning according to an embodiment of the present disclosure.

In addition, at least part of the method for image-based positioning according to an embodiment of the present disclosure may be implemented as a program or software executed in the computing device 1000, and the program or software may be stored in a computer-readable medium.

In addition, at least part of the method for image-based positioning according to an embodiment of the present disclosure may be implemented with hardware that can be electrically connected to the computing device 1000.

According to embodiments, positioning is performed using hard classification and soft classification. Therefore, it is possible to obtain the advantages of regression and classification at the same time by using soft classification, and in particular, it is possible to solve the problem of incorrectly outputting the median values of several modes when only regression is used. In addition, the confidence of the predicted position value can be obtained by using the hard classification, and accordingly, the fusion engine can facilitate fusion with other information.

Further, for discontinuous (discrete) acquired data other than continuously acquired learning data, positioning can be performed more efficiently by using classification.

In addition, soft classification using linear interpolation is performed on discontinuous data, and more accurate positioning may be achieved.

Also, the absolute position of each anchor of the training data set does not need to be stored in a separate memory, and only parameters for the maximum value, minimum value, and cell size are stored to calculate the absolute position of cells.

In addition, since the image-based positioning based on hard classification provides the confidence of the result value compared to the conventional methods of finding a camera pose using only regression, it is easy to fuse with the results of other positioning methods. It is also possible to overcome the inaccuracy of regression compared to the existing methods of finding camera poses using only regression to some extent.

In addition, since the image-based positioning using soft classification based on linear interpolation can take advantage of both regression and classification at the same time, the application range can be broadened. The embodiments of the present disclosure are not implemented only through the apparatus and/or method described above, but may be implemented through a program for realizing a function corresponding to the configuration of the embodiment of the present disclosure, and a recording medium in which the program is recorded. This implementation can also be easily performed by expert person skilled in the technical field to which the present disclosure belongs from the description of the above-described embodiments.

The components described in the embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the embodiments may be implemented by software, and the software may be recorded on a recording medium. The components, functions, and processes described in the embodiments may be implemented by a combination of hardware and software.

The method according to embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages, and may be deployed in any form including a stand-alone program or a module, a component, a subroutine, or other units appropriate for use in a computing environment. A computer program may be deployed to be executed on one computer or on multiple computers at one site or distributed across multiple sites and interconnected by a communication network. Processors appropriate for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic disks, magneto-optical disks, or optical disks. Examples of information carriers appropriate for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk, and a read only memory (ROM), a random access memory (RAM), a flash memory, an erasable programmable ROM (EPROM), and an electrically erasable programmable ROM (EEPROM), and any other known computer readable medium. A processor and a memory may be supplemented by, or integrated with, a special purpose logic circuit. The processor may run an operating system (OS) and one or more software applications that run on the OS. The processor device also may access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific embodiment. Features described in the specification in the context of individual embodiments may be implemented as a combination in a single embodiment. In contrast, various features described in the specification in the context of a single embodiment may be implemented in multiple embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood that the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described embodiments in all embodiments, and it should be understood that the above-described program components and apparatuses may be incorporated into a single software product or may be packaged in multiple software products. It should be understood that the embodiments disclosed herein are merely illustrative and are not intended to limit the scope of the disclosure. It will be apparent to one of ordinary skill in the art that various modifications of the embodiments may be made without departing from the spirit and scope of the claims and their equivalents.

What is claimed is:

1. A method for image-based positioning to predict a camera pose from image data, comprising:
    obtaining, by a positioning apparatus, a prediction result indicating which cell the image data belongs to among cells constituting a space for positioning, wherein the prediction result includes at least one among a first prediction result obtained through a hard classification-based learning classification network and a second prediction result obtained through a soft classification-based learning classification network;
    obtaining, by the positioning apparatus, map information on the space for positioning by using a cell index selected based on the prediction result, wherein the map information includes minimum and maximum values of coordinates constituting a cell and a cell size for each cell index and the cell index is in a form of coordinates; and
    calculating, by the positioning apparatus, a position of the image data based on the map information and outputting a corresponding camera pose,
    wherein the position of the image data is based on at least one among a first position and a second position, and the first position is calculated according to map information obtained based on the first prediction result and the second position is calculated according to map information obtained based on the second prediction result.

2. The method of claim 1, wherein
the outputting of a camera pose comprises
the first position or the second position is calculated based on a sum of weights of neighboring cells of the selected cell index in the space for positioning.

3. The method of claim 1, wherein
a cell constituting the space for positioning is mapped to one class, and
the prediction result includes confidence for each class, wherein the outputting of a camera pose comprises
outputting of the camera pose and confidence corresponding thereto.

4. The method of claim 3, wherein
the obtaining of map information comprises:
    selecting a class having highest confidence among the confidence for each class, and obtaining a cell index mapped to the selected class; and
    obtaining map information on the space for the positioning by using the obtained cell index.

5. The method of claim 1, wherein
the hard classification-based learning classification network is learned through hard classification-based learning,
the hard classification-based learning is performed by converting training data into an index for applying camera pose classification and performing hard labeling for learning on each index, and the hard labeling is performed by setting only one index cell corresponding to a camera pose to "1" and setting the rest to "0".

6. The method of claim 1, wherein
a cell constituting the space for positioning is mapped to one class,
the prediction result includes a score for each class, and the score is an evaluation score calculated based on a loss function,
wherein the obtaining of map information comprises:
    selecting a class having a highest score among the scores for each class, and obtaining a cell index mapped to the selected class; and
    obtaining map information on the space for the positioning by using the obtained cell index.

7. The method of claim 1, wherein
the soft classification-based learning classification network is learned through soft classification-based learning,
the soft classification-based learning is performed by converting training data into indexes for applying camera pose classification and performing soft labeling for learning on each index, and the soft labeling is based on a linear interpolation method.

8. The method of claim 7, wherein
the soft labeling determines a soft label based on a distance and an area of a neighboring cell adjacent to an absolute location.

9. An apparatus for image-based positioning to predict a camera pose from image data, comprising:
    an interface device configured to receive image data for image-based positioning;
    a memory in which map information on cells constituting a space for positioning is stored, wherein the map information includes minimum and maximum values of coordinates constituting a cell and a cell size for each cell index and the cell index is in a form of coordinates; and
    a processor for predicting a camera pose based on the image data, wherein
    the processor performs operations by:
        obtaining, through the interface device, a prediction result indicating which cell the image data belongs to among cells constituting a space for positioning, wherein the prediction result includes at least one among a first prediction result obtained through a hard classification-based learning classification network and a second prediction result obtained through a soft classification-based learning classification network;
        obtaining map information on the space for positioning by using a cell index selected based on the prediction result; and
        calculating a location for the image data based on the map information and outputting a corresponding camera pose,
    wherein the position of the image data is based on at least one among a first position and a second position, and the first position is calculated according to map information obtained based on the first prediction result and the second position is calculated according to map information obtained based on the second prediction result.

10. The apparatus of claim 9, wherein
the processor calculates the first position or the second position based on a sum of weights of neighboring cells of the selected cell index in the space for positioning when performing the operation of outputting a camera pose.

11. The apparatus of claim 9, wherein cells constituting the space for positioning are mapped to one class, and the prediction result includes confidence for each class, wherein the processor outputs the camera pose and confidence corresponding thereto when performing an operation of outputting a camera pose.

12. The apparatus of claim 11, wherein
when performing the operation of obtaining map information,
the processor performs the operation by:
selecting a class having highest confidence among the confidence for each class, and obtaining a cell index mapped to the selected class; and
obtaining map information on the space for positioning by using the obtained cell index.

13. The apparatus of claim 9, wherein
the hard classification-based learning classification network is learned through hard classification-based learning,
the hard classification-based learning is performed by converting training data into an index for applying camera pose classification and performing hard labeling for learning on each index, and the hard labeling is performed by setting only one index cell corresponding to a camera pose to "1" and setting the rest to "0".

14. The apparatus of claim 9, wherein
a cell constituting the space for positioning is mapped to one class,
the prediction result includes a score for each class, and the score is an evaluation score calculated based on a loss function,
wherein when performing the operation of obtaining map information,
the processor performs the operation by:
selecting a class having a highest score among the scores for each class, and obtaining a cell index mapped to the selected class; and
obtaining map information on the space for the positioning by using the obtained cell index.

15. The apparatus of claim 9, wherein
the soft classification-based learning classification network is learned through soft classification-based learning,
the soft classification-based learning is performed by converting training data into indexes for applying camera pose classification and performing soft labeling for learning on each index, and the soft labeling is based on a linear interpolation method.

16. The apparatus of claim 9, wherein
the processor comprises:
a hard classification layer unit for outputting a hard classification result including a camera pose predicted for the image data and confidence corresponding thereto by performing the operation of obtaining a prediction result by using the hard classification-based learning classification network, the operation of obtaining map information, and the operation of outputting a corresponding camera pose;

a soft classification layer unit for outputting a soft classification result including a camera pose predicted for the image data by performing the operation of obtaining a prediction result by using the soft classification-based learning classification network, the operation of obtaining map information, and the operation of outputting a corresponding camera pose; and a fusion processing unit for outputting a final camera pose predicted for the image data by converging the hard classification result and the soft classification result.

17. The apparatus of claim 9, wherein
the processor comprises:
a hard classification layer unit for outputting a hard classification result including a camera pose predicted for the image data and confidence corresponding thereto by performing the operation of obtaining a prediction result by using the hard classification-based learning classification network, the operation of obtaining map information, and the operation of outputting a corresponding camera pose;

a regression layer unit for outputting a regression estimation result including a camera pose predicted for the image data through regression estimation; and a fusion processing unit for outputting a final camera pose predicted for the image data by converging the hard classification result and the regression estimation result.

18. The apparatus of claim 9, wherein
the processor comprises:
a soft classification layer unit for outputting a soft classification result including a camera pose predicted for the image data by performing the operation of obtaining a prediction result by using the soft classification-based learning classification network, the operation of obtaining map information, and the operation of outputting a corresponding camera pose;

a regression layer unit for outputting a regression estimation result including a camera pose predicted for the image data through regression estimation; and a fusion processing unit for outputting a final camera pose predicted for the image data by converging the soft classification result and the regression estimation result.

19. The apparatus of claim 9, wherein
the processor comprises:
a hard classification layer unit for outputting a hard classification result including a camera pose predicted for the image data and confidence corresponding thereto by performing the operation of obtaining a prediction result by using the hard classification-based learning classification network, the operation of obtaining map information, and the operation of outputting a corresponding camera pose;

a soft classification layer unit for outputting a soft classification result including a camera pose predicted for the image data by performing the operation of obtaining a prediction result by using the soft classification-based learning classification network, the operation of obtaining map information, and the operation of outputting a corresponding camera pose;

a regression layer unit for outputting a regression estimation result including a camera pose predicted for the image data through regression estimation; and a fusion processing unit for outputting a final camera pose predicted for the image data by converging the soft classification result, the hard classification result, and the regression estimation result.

* * * * *